(No Model.) 3 Sheets—Sheet 2.

D. T. PIOT.
ELECTRIC MOTOR.

No. 263,353. Patented Aug. 29, 1882.

Witnesses
R. G. Radham.
F. Page.

Inventor.
D. T. Piot
per Alex Browne
Attorney

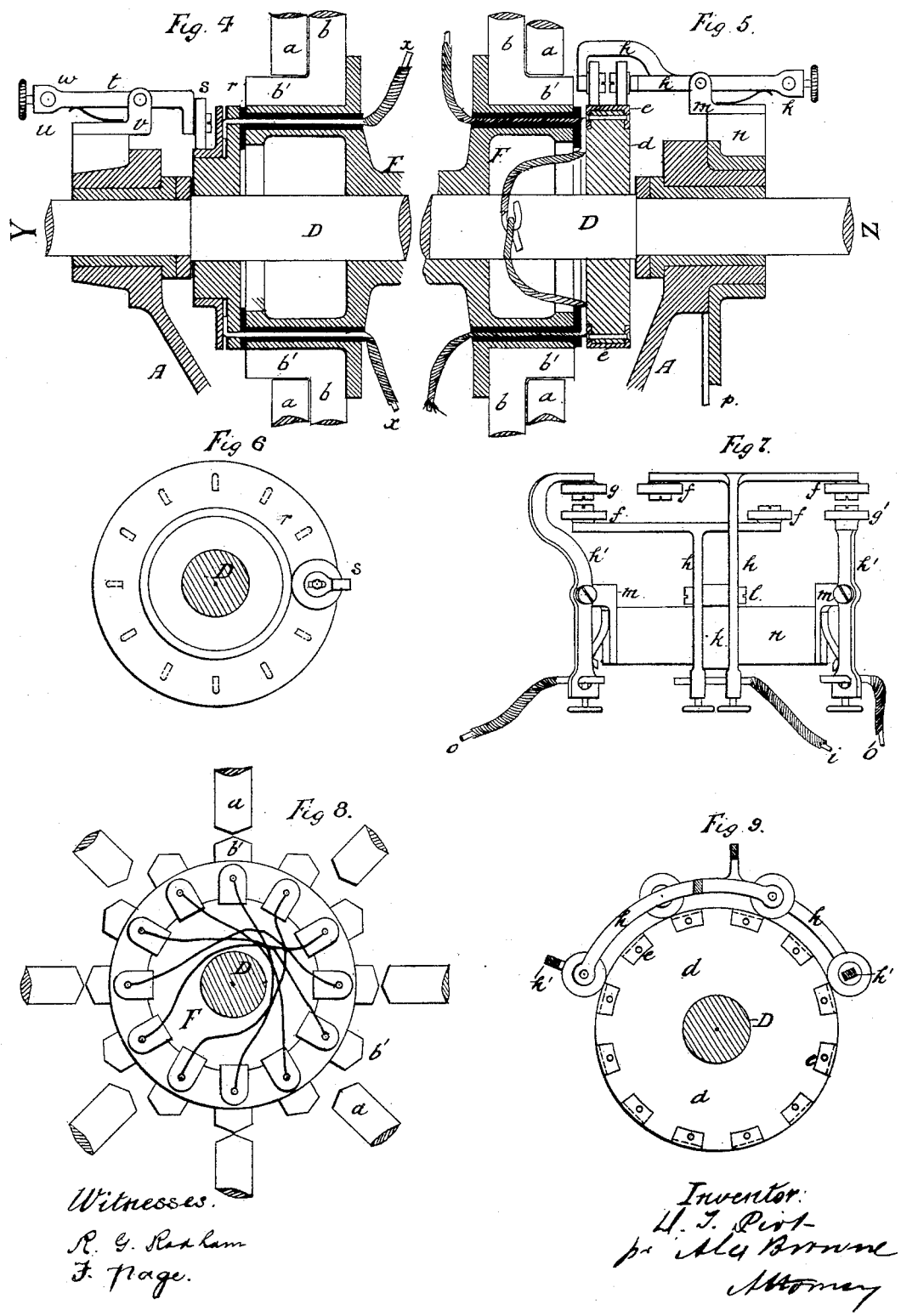

UNITED STATES PATENT OFFICE.

DÉSIRÉ THOMAS PIOT, OF GREAT TITCHFIELD STREET, COUNTY OF MIDDLESEX, ENGLAND.

ELECTRIC MOTOR.

SPECIFICATION forming part of Letters Patent No. 263,353, dated August 29, 1882.

Application filed May 17, 1882. (No model.) Patented in England November 5, 1881, No. 4,851, and in France May 2, 1882.

*To all whom it may concern:*

Be it known that I, DÉSIRÉ THOMAS PIOT, a subject of the Republic of France, residing at Great Titchfield Street, in the county of Middlesex, England, have invented a certain new and useful Improved Electric Motive Engine; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.
My invention relates to an electric motive engine; and it has for its object to enable a greater length of wire to be wound on the coils of the armature without increasing the distance at which the electrical attractions and repulsions between the field electro magnet or magnets and the armature take place, whereby the motive power of the machine is greatly increased.

My improved machine consists of one or more field electro-magnets radial to the armature axis, and of an armature composed of a number of coils arranged around and parallel to a common axis of rotation. The coils are wound circularly in the ordinary way upon soft-iron cores, which are cranked at each end of the coil, and connected at their extremities to disks mounted upon a shaft or axis. The cranked portion of the several cores carrying the coil turns between the poles of the field electro magnet or magnets, and the straight end portions of the cores together form a cylindrical part of the armature of smaller diameter, which comes opposite lateral polar extensions of the field magnet or magnets corresponding to the length of that part of the armature; and in order to explain my said invention more fully I will now proceed to describe the same with reference to the accompanying sheets of drawings, in which the same letters denote the same parts in all the figures.

Figure 1:
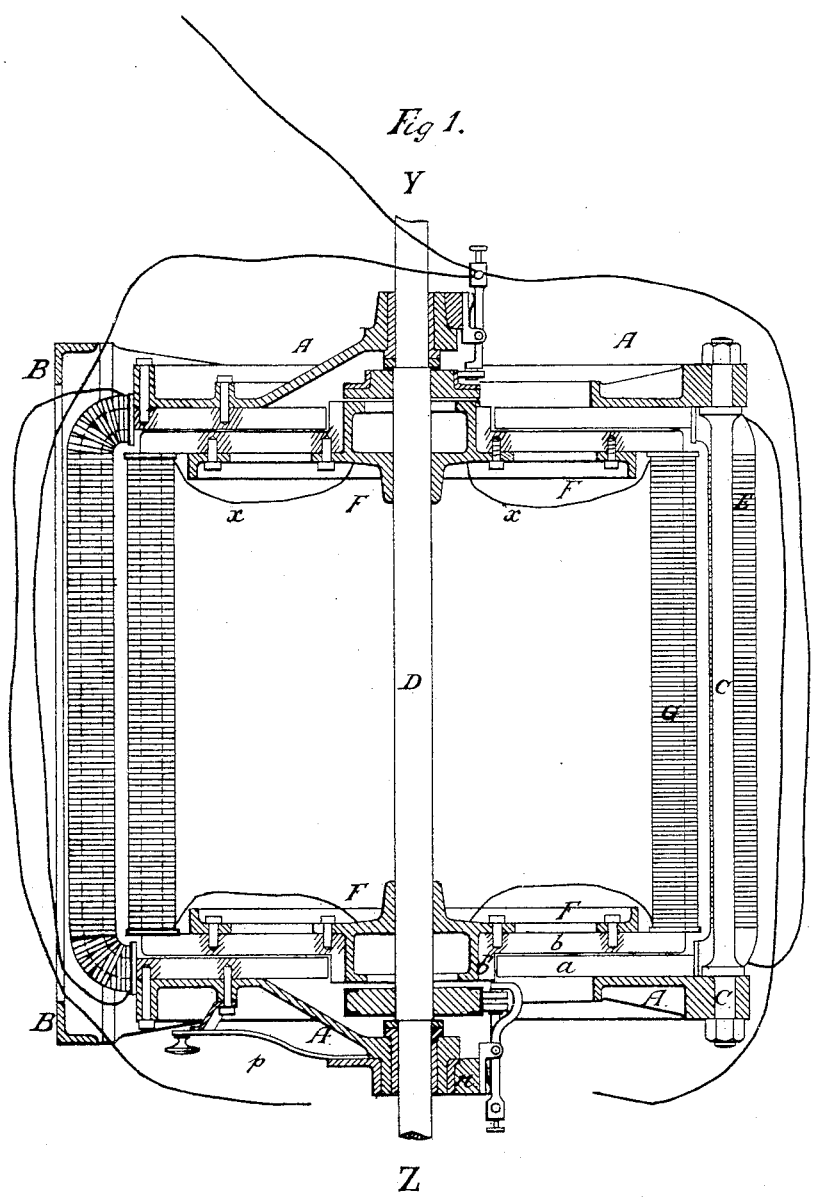
Figure 2:
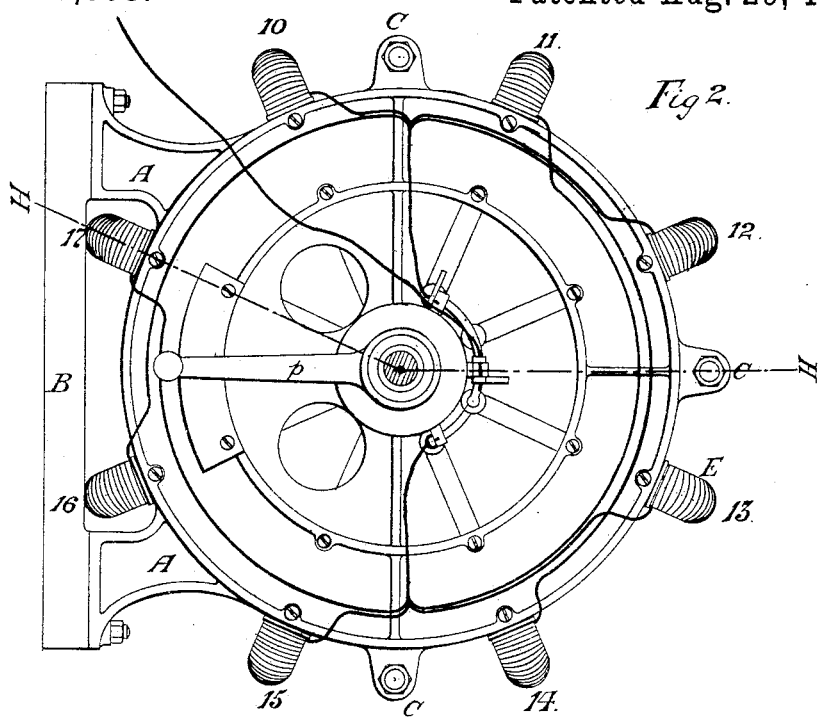
Figure 3:
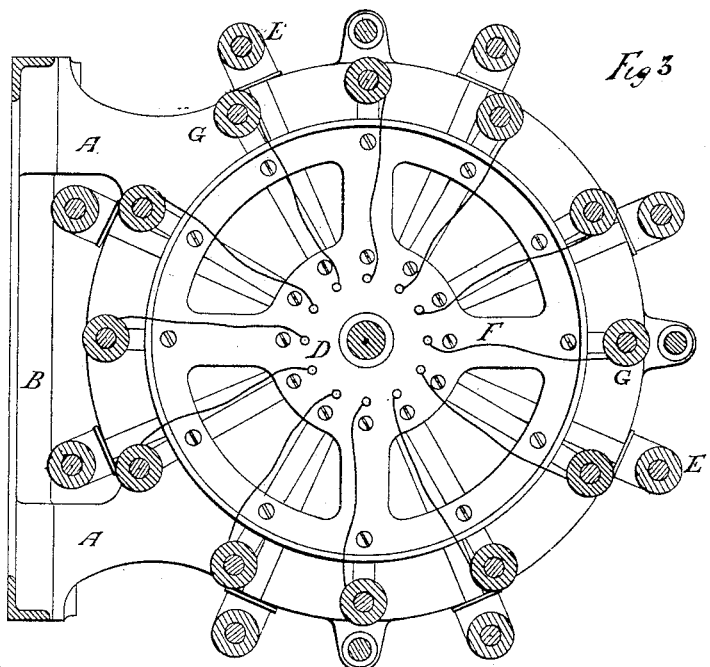

In the drawings, Sheet 1, Figure 1 shows a longitudinal section through line H H on Fig. 2, Sheet 2, of an electric motive engine constructed according to my said invention. Sheet 2, Fig. 2 shows an end elevation, and Fig. 3 a cross-section, of same. Sheet 3, Figs. 4, 5, 6, 7, 8, and 9 show details, hereinafter referred to, drawn to a larger scale than Figs. 1, 2, and 3.

With reference to Sheets 1 and 2, A A are two frames bolted onto a bed-plate, B, and bolted together by pillars C, carrying a shaft, D. To these standards are fixed the field electro-magnets E at equal distances apart, and on the shaft D are keyed disks, of brass or other non-magnetic material, F F, carrying the coils or bobbins G, forming the armature, these bobbins being also equidistant on the disks. The cores of the field-magnets E are composed of soft iron, and on these cores a properly-insulated conducting-wire (of copper, by preference) is coiled circularly, preferably about five layers, and insulated also from the iron cores. The iron cores of the field-magnets E are of a crank shape, so as to form polar extensions $a$, and the cores of the bobbins G are also cranked, as shown at $b$, to work between the poles or polar extensions $a$ of the field-magnets E, and turned up at $b'$, so as to work opposite the ends of the polar extensions $a$, as shown. The cranked extensions $a$ and $b$ of the cores of bobbins and magnets are left bare, and these extensions are so adjusted that the outer edges of the cores $b$ of the armature revolve as closely as possible to the inner edges of the polar extensions $a$ of the field-magnets. These edges of $a$ and $b$ are formed by preference pointed, as shown by Fig. 8, Sheet 3, or of such configuration as to offer as little resistance as possible when the extensions $b$ of the bobbins G pass the polar extensions $a$ of the field-magnets E.

I will now proceed to describe the commutator and its various connections (shown at Figs. 4, 5, 6, 7, 8, and 9 on Sheet 3) for working my improved electric motive engine without reversing the current, which is preferable to using any commutator or commutators producing alternate currents in opposite directions, because in the former case the coils are not liable to become heated.

Fig. 5, Sheet 3, $d$ is a disk, formed of wood or other suitable insulating material, fastened to the aforesaid disk F, so as to revolve therewith.

On the periphery of this disk $d$ are fitted, at equal distances apart, a number of metal plates, $e$, made of copper or other suitable conducting metal, corresponding to the number of bobbins in the armature. These plates must all be of the same length on periphery of disk $d$. The wire from each bobbin at one end is connected with one of the metal plates $e$ on the disk $d$, and also connected with the wire from the bobbin, which is radially opposite to it, in order to make electric communication.

Four rollers, $f f f f$, and two rollers, $g$ and $g'$, are kept in contact with the periphery of the disk $d$, as shown at Fig. 9, Sheet 3. The rollers $f$ work freely on frames $h h$, which are in communication with one pole of the electric circuit by means of wire $i$. These rollers are kept in forced contact with the periphery of the disk $d$ by means of the spring $k$ acting on frames $h h$, which are pivoted at $l$. The other rollers, $g$ and $g'$, are placed so as to come exactly opposite two of the rollers $f$, and are similarly kept in contact with the periphery of disk $d$. The frames $h h$ and $h' h'$ are pivoted on brackets $m$, which are attached to a block, $n$, composed of wood or other insulating material, so as to entirely insulate rollers $f$ from rollers $g$. The rollers $g$ and $g'$ convey part of the same electric current to the field-magnets by means of the plates $e$ on disk $d$, which plates are electrically influenced by the rollers $f$. The block $n$ is fitted with a handle, $p$, Fig. 2, and is so placed on frame A as to be capable of being turned either to right or left, so as to move the frames $h h$ and $h' h'$, which carry rollers $f$ and $g$ and $g'$ a certain distance round the periphery of disk $d$, as hereinafter described. The other pole of the electric circuit communicates with the other ends of the bobbins of the armature and the field-magnets by means of the roller $s$, mounted on a pivoted arm, $t$, and kept in contact with disk $r$ by spring $u$. The arm $t$ is pivoted to bracket $v$, which is attached to a block of wood or other insulating material, all shown clearly at Fig. 4.

All the wires of the field-magnets E at one end and the wire from one pole of the electrical circuit are put into communication with the arm $t$ at $w$, and the bobbins of the armature are also put in connection with the same pole by means of the roller $s$, running on the metal disk $r$, which is in contact with the wires $x$, coming from the bobbins G, so that part of the current from this pole goes into the field-magnets E and part into the bobbins of armature. In order to complete the circuit, the other electric pole is put into communication with the commutator at the other end of the machine by means of wire $i$. The bobbins, which are set opposite each other, are connected together by their wires, which wires communicate with their respective plates $e$ on disk $d$, as shown at Figs. 5 and 8, Sheet 3. At that end of the machine marked Z, Sheet 1, the ends of the wires from the alternate field-magnets (marked 10 12 14 16 on Fig. 2, Sheet 2) are in electric communication with one of the rollers, $g$, Fig. 7, Sheet 3, and the other magnets (marked 11 13 15 17) are in electric communication with the other roller, $g'$, by means of wires $o$ and $o'$, Fig. 7, respectively, and with the plates $e$ on disk $d$, Fig. 9. The action is as follows: Upon making electrical communication the armature will revolve, carrying with it disk $d$, thus making and breaking electric contact with magnets and bobbins of armature at the proper times.

In order to reverse the action of the machine or form a brake, it is simply necessary to move handle $p$ in the required direction, thus shifting the position of rollers $f$, $g$, and $g'$ with regard to the plates $e$ on the disk $d$, thereby changing the electrical communication.

I would here remark that although I have described and shown an electric motive engine in which the armature revolves as being preferable, it is evident that by attaching the electro-magnets to the axle or shaft, so that they may revolve round the armature, (which in this case would be stationary,) the same result would be produced.

If it is desired to work this machine by an alternating current, it must be provided with two suitable commutators, which it is unnecessary to describe.

I would remark, in conclusion, that I do not intend to limit myself to the various details or to the number of magnets or bobbins described, and shown on drawings; but

What I claim as my invention, and desire to secure by Letters Patent, is—

In an electro-motive engine, the combination of crank-shaped soft-iron cores, wound circularly with insulated conducting-wire, forming the coils or bobbins of the armature, with similarly-shaped electro-magnets, all substantially as and for the purposes set forth.

D. T. PIOT.

Witnesses:
R. G. RODHAM, *Engineer*,
F. PAGE, *Clerk*,
*Both of 5 Southampton Buildings, Holborn, London, W. C.*